United States Patent [19]

Schmitt

[11] Patent Number: 5,642,935

[45] Date of Patent: Jul. 1, 1997

[54] HEADLAMP ADJUSTOR WITH VENT TUBE

[75] Inventor: Karl R. Schmitt, Rockford, Ill.

[73] Assignee: Textron Inc., Providence, R.I.

[21] Appl. No.: 509,130

[22] Filed: Jul. 31, 1995

[51] Int. Cl.$^6$ ................................................ F21V 29/00
[52] U.S. Cl. ................................................ 362/294; 362/66
[58] Field of Search ........................ 362/61, 66, 294, 362/345, 373

[56] References Cited

U.S. PATENT DOCUMENTS

| | | | |
|---|---|---|---|
| 4,796,163 | 1/1989 | Dressler | 362/294 X |
| 4,802,068 | 1/1989 | Mokry | 362/294 X |
| 5,251,111 | 10/1993 | Nagengast et al. | 362/61 |
| 5,355,287 | 10/1994 | Denley | 362/66 |
| 5,488,547 | 1/1996 | Hiraoka | 362/22 |

OTHER PUBLICATIONS

Vent Made by Filtertek, Inc., no publication date.
*Designing and Specifying Ventilation System For Exterior Lamps,* Ford Plastic and Trim Products Division, pp. 1–12, Feb. 8, 1994.

*Primary Examiner*—Stephen F. Husar
*Attorney, Agent, or Firm*—Trexler, Bushnell, Giangiorgi & Blackstone, Ltd.

[57] ABSTRACT

A venting structure is provided on a headlamp adjustor for venting the inside of a sealed stationary component which houses a movable headlamp component, such as a reflector member, in a headlamp arrangement. The headlamp adjustor is mounted to the sealed stationary component and is used to effect pivotal motion of the headlamp component. The headlamp adjustor includes a housing member and an adjusting screw member which is operatively engaged with an axial bore through the housing member. A vent passageway is formed through the housing member or through the screw member. The venting structure is formed of a one-way vent which is connected to headlamp adjustor and is in communication with the vent passageway through the housing member. The vent allows pressure and moisture laden air to pass outwardly from the inside of the sealed stationary component to the atmosphere while only allowing air and a limited amount of moisture to pass from the atmosphere to the inside of the sealed stationary component. The one-way vent may take the form of a microporous filter material housed in a tube-like body member or a rubber flapper valve.

27 Claims, 3 Drawing Sheets

HEADLAMP ADJUSTOR WITH VENT TUBE

BACKGROUND OF THE INVENTION

This invention is generally directed to a novel venting structure formed in a headlamp adjustor mechanism for venting an automotive headlamp arrangement. More particularly, the invention contemplates a venting structure which is incorporated into the design of a headlamp adjustor mechanism to vent pressure and moisture laden air from the inside of the headlamp arrangement to the atmosphere while allowing the passage of air and a minimal amount of moisture, if any, back into the inside of the headlamp arrangement to equalize internal pressures with atmospheric pressure.

Headlamp arrangements commonly used on automobiles today consist of a moveable headlamp component, such as a reflector member or the like, which is housed in a stationary component connected to the frame of the automobile. The stationary component is sealed to prevent the entrance of dirt, contaminants and moisture into the headlamp arrangement. An adjustor mechanism is provided through an aperture in the stationary component and is used to effect pivotal movement of the reflector member.

The adjustor mechanism includes a housing member which is sealed to the stationary component, and an adjusting screw member which is housed in an axial bore through the housing member. An end of the adjusting screw engages the moveable headlamp component to effect pivotal motion of the component when the screw is moved. The adjustor mechanism is sealed so as to prevent the entrance of moisture inside of the stationary component so as to prevent interference with the workings of the movable headlamp component.

Despite the fact that the headlamp arrangement is sealed to prevent the entrance of moisture therein, water often accumulates inside of the headlamp arrangement. This occurs because of microcracks in the joints between the components which are caused by stress over time which allow moisture to seep into the headlamp arrangement. As a result, sealed or improperly ventilated headlamp arrangements often eventually fail to keep the moisture out of the arrangement which can cause interference with the functioning of the headlamp.

The microcracks occur due to pressure differences encountered in use together with thermal expansion and contraction of the housing material. As such, when the headlamp is turned on, the air inside the headlamp is heated by the energized bulb in the headlamp which causes the air trapped in the lamp housing to expand and the pressure inside the sealed headlamp arrangement to build up. This, of course, is in addition to the thermal expansion caused by such heat. The force due to the pressure build up persists until the bulb is turned off. As the headlamp is turned on and off over time, the joints between the components eventually crack due to the pressure extremes and the expansion and contraction of the components.

During the time period when the bulb in the headlamp is on, the air from inside the headlamp leaks through the microcracks which slowly reduces the pressure inside the headlamp arrangement to atmospheric conditions. When the bulb is turned off, an equal amount of air must be allowed to pass back into the headlamp arrangement so that the air pressure inside the headlamp arrangement can equalize with atmospheric. Since the cracks are too small to allow for the free flow of air therethrough, a negative pressure condition persists as air slowly enters into the headlamp through the cracks. Under these conditions, if the headlamp arrangement is subjected to wet weather conditions, moist air and/or water droplets are drawn into the headlamp arrangement.

The headlamp arrangement does not usually eliminate the moisture inside of the arrangement when the headlamp is turned on again. Over time, an appreciable amount of water builds up within the headlamp arrangement.

To eliminate, or to at least substantially minimize, the entrance of moisture into the headlamp arrangement during energization of the bulb, moveable reflector headlamps are vented to decrease the pressure build up inside the headlamp and to allow the moisture which has entered into the headlamp arrangement to exit the arrangement. Specifically, the vents allow moisture and air pressure out of the headlamp and only air and a limited amount of moisture into the headlamp. These vents are typically formed as a small hole, a rubber diaphragm or a microporous meshed filter.

One such microporous filter, which uses a non-woven hydrophobic membrane made of Gore-tex®, is manufactured by Filtertek, Inc. Gore-tex® is a registered trademark of W. L. Gore & Associates, Inc. The filter is housed in a tube-like body member which is attached to an orifice in the stationary headlamp component. A cap snaps over the end of the tube-like body, but does not seal the end of the tube-like body, to protect the microporous filter from dirt, dust or other particles.

OBJECTS AND SUMMARY OF THE INVENTION

A general object of the present invention is to provide a venting structure which is formed as part of a headlamp adjustor mechanism which is used to vent pressure and moisture laden air from inside of a headlamp arrangement to atmosphere while allowing air and a limited amount of moisture back into the arrangement.

Another object of the present invention is to provide a headlamp adjustor mechanism having a venting structure that eliminates the need for a separate venting structure to be attached to a stationary component of a headlamp arrangement.

A further object of the present invention is to provide a venting structure which is formed as part of a headlamp adjustor mechanism which is used to vent pressure and moisture laden air from inside of a headlamp arrangement to atmosphere while allowing air and a limited amount of moisture back into the arrangement so as to allow the interior of the headlamp arrangement to equalize with the atmosphere.

The present invention discloses a venting structure which is formed as part of a headlamp adjustor mechanism for venting pressure and moisture laden air from the inside of a sealed automotive headlamp arrangement to the atmosphere while allowing air and a limited amount of moisture back into the sealed headlamp arrangement. The headlamp arrangement includes a movable headlamp component, such as a reflector member, which is housed in a sealed stationary component.

The headlamp adjustor mechanism is mounted to the sealed stationary component and is used to effect pivotal motion of the headlamp component. The headlamp adjustor mechanism includes a housing member and an adjusting screw member which is operatively engaged with an axial bore through the housing member.

The venting structure is provided as part of the adjustor mechanism and includes a vent passageway which extends through the housing member or through the adjusting screw member, and a one-way vent which is connected to the headlamp adjustor mechanism and is in communication with the vent passageway. The one-way vent allows pressure and moisture laden air to pass outwardly from the inside of the sealed stationary component to the atmosphere while only allowing air and a limited amount of moisture to pass from the atmosphere to the inside of the sealed stationary component. The one-way vent may take the form of a microporous filter material, such as Gore-tex®, housed in a tube-like body member or a rubber flapper vent. The vent passageway may be in fluid communication with the axial bore or completely separated from the bore.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figures 1, 1A, 2, 3:
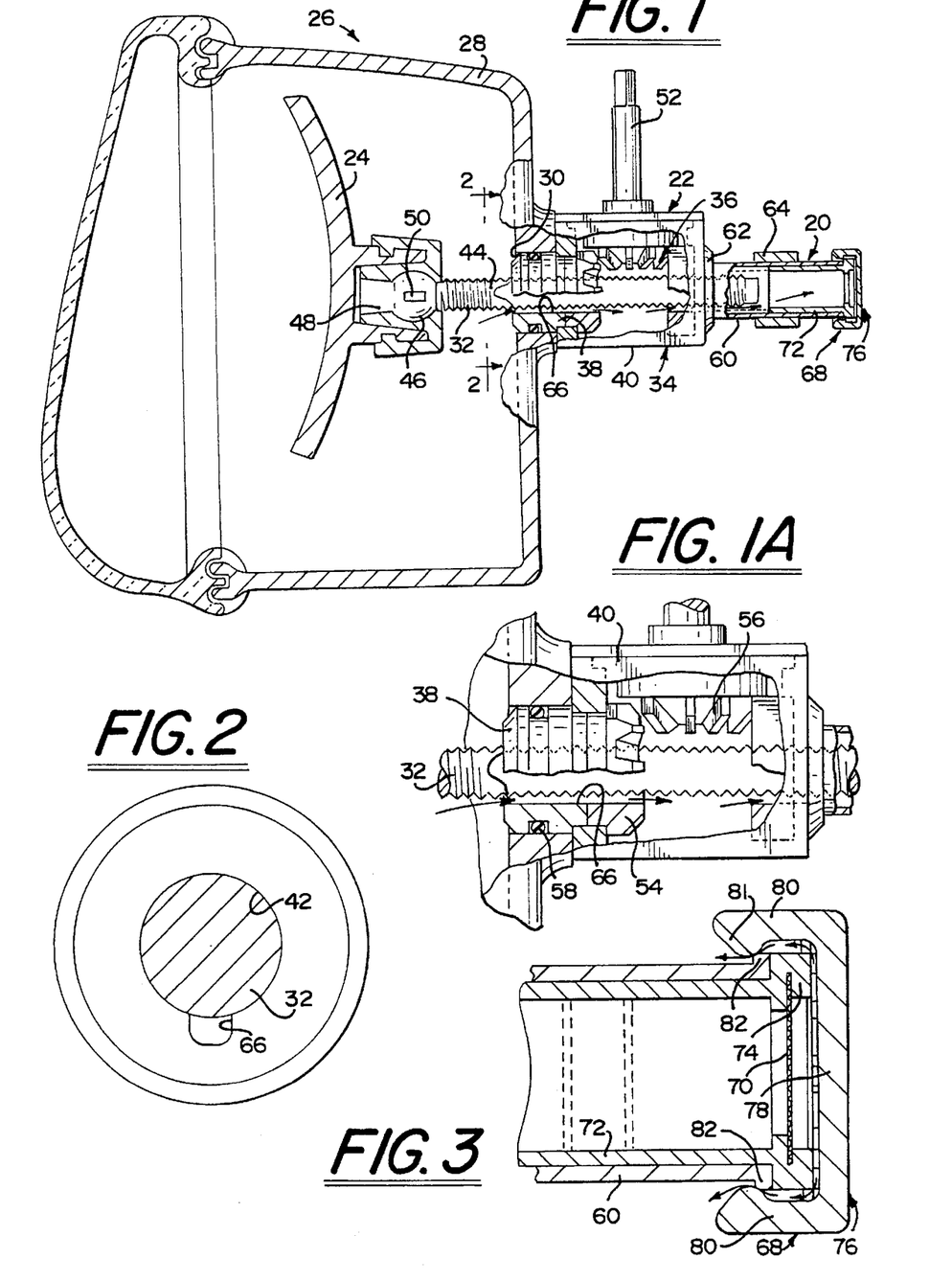
FIG. 1 is a partially cross-sectional view of a first embodiment of a headlamp adjustor mechanism in accordance with the present invention, shown with its housing partially broken-away, such mechanism having a venting structure formed therewith and being shown in its environment as attached to a headlamp arrangement.
FIG. 1A is an enlarged sectional view showing the broken-away housing of the headlamp adjustor mechanism shown in FIG. 1.
FIG. 2 is a cross-sectional view of the headlamp adjustor along line 2—2 in FIG. 1.
FIG. 3 is a cross-sectional view of an alternate embodiment of a vent which forms part of the venting structure.
Figure 4:
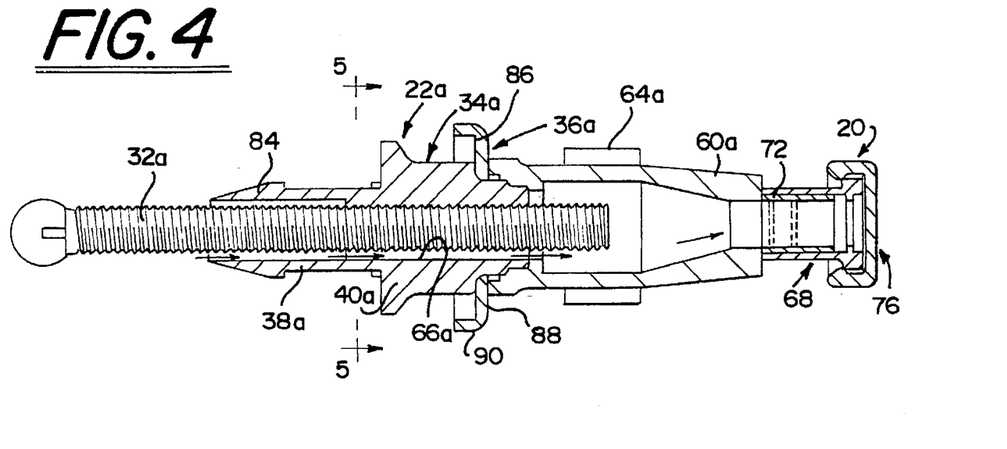
FIG. 4 is a cross-sectional view of a second embodiment of a headlamp adjustor mechanism in accordance with the present invention, such mechanism having a venting structure formed therewith.
Figures 5, 6:
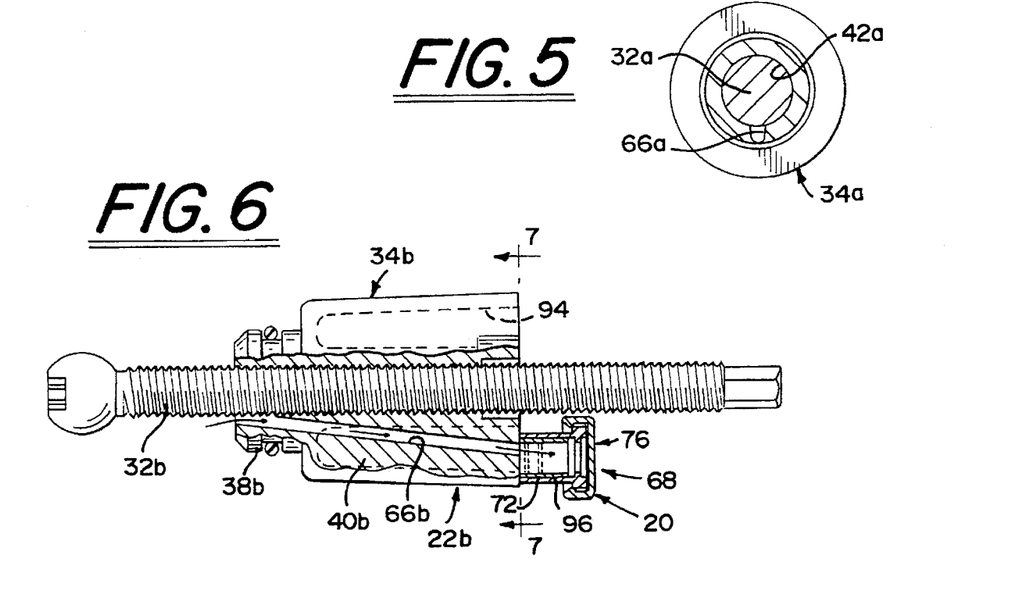
FIG. 5 is a cross-sectional view of the headlamp adjustor mechanism along line 5—5 in FIG. 4.
FIG. 6 is a partial cross-sectional view of a third embodiment of a headlamp adjustor mechanism in accordance with the present invention, such mechanism having a venting structure formed therewith.
Figure 7:
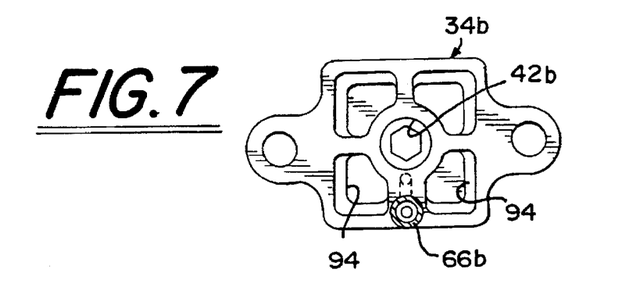
FIG. 7 is a partial cross-sectional view of the headlamp adjustor mechanism along line 7—7 in FIG. 6.
Figure 8:
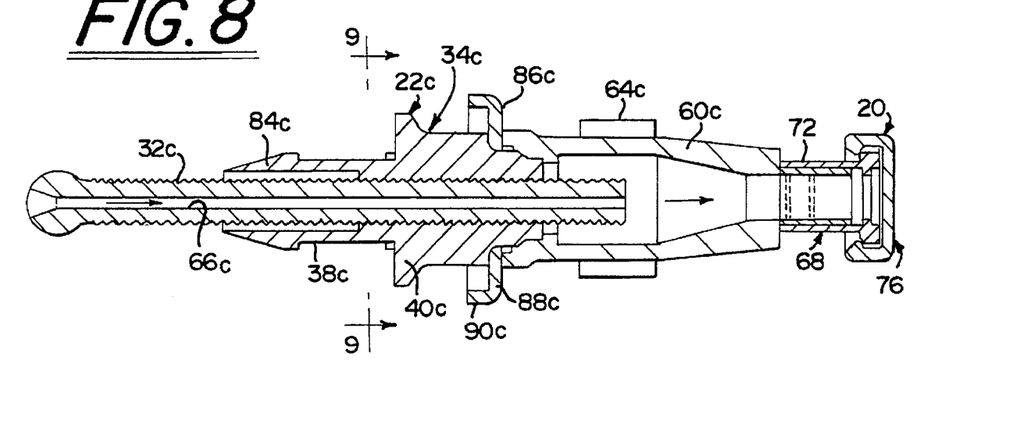
FIG. 8 is a cross-sectional view of a headlamp adjustor mechanism similar to that of the second embodiment shown in FIG. 4 and in accordance with the present invention, such mechanism having a venting structure formed therewith.
Figure 9:
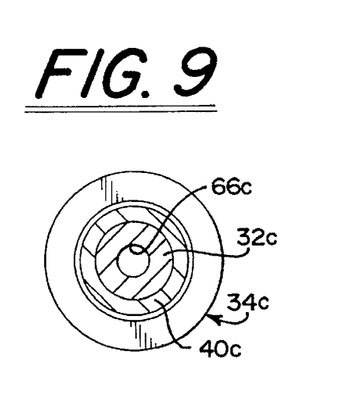
FIG. 9 is a cross-sectional view of the headlamp adjustor mechanism along line 8—8 in FIG. 8.

Directing attention to the drawings, a novel venting structure 20 is formed as part of a headlamp adjustor mechanism 22, 22a, 22b, 22c which is used to adjust the aiming of a movable headlamp component 24 in a headlamp arrangement 26. A first embodiment of the headlamp adjustor mechanism 22 is shown in FIGS. 1, 1A and 2. A second embodiment of the headlamp adjustor mechanism 22a is shown in FIGS. 4 and 5. A third embodiment of the headlamp adjustor mechanism 22b is shown in FIGS. 6 and 7. FIGS. 8 and 9 illustrate an embodiment of the headlamp adjustor mechanism 22c that is similar to that of the second embodiment, except for the differences noted herein. The elements of the first embodiment of the headlamp adjustor mechanism 22 are denoted solely by reference numerals. Like elements of the second embodiment of the headlamp adjustor mechanism 22a are denoted by like reference numerals with the suffix "a" thereafter and like elements of the third embodiment of the headlamp adjustor mechanism 22b are denoted by like reference numerals with the suffix "b" thereafter. In addition, like elements of the embodiment of the headlamp adjustor mechanism 22c shown in FIGS. 8 and 9 are denoted by like reference numerals with the suffix "c" thereafter.

While specific embodiments of the headlamp adjustor mechanism 22, 22a, 22b, 22c are shown in the drawings and described herein, it is to be understood that the type of adjustor mechanism that has the venting structure of the present invention formed therewith is not limited to the specific embodiments shown and one skilled in the art may devise or select various modifications. For example, the venting structure 20 can also be formed in right angle and straight through adjustor mechanisms having zeroing devices.

Directing attention to the first embodiment of the headlamp adjustor mechanism 22, as shown in FIGS. 1, 1A and 2, the mechanism 22 is shown in its environment as attached to the headlamp arrangement 26. The venting structure 20 is used to vent pressure and moisture laden air and also heat from inside the headlamp arrangement 26 to the atmosphere while only allowing air and a limited amount of moisture back into the inside of the headlamp arrangement 26.

The movable headlamp component 24, which is a reflector member or the like, is housed in a sealed stationary component 28, such as a headlamp housing, in the headlamp arrangement 26. The stationary component 28 has an orifice 30 therethrough along a rearside of the component 28 for the placement of the headlamp adjustor mechanism 22 therethrough.

As shown in FIG. 1, the first embodiment of the headlamp adjustor mechanism 22 generally includes an elongate, threaded adjusting screw 32, a housing 34 and a driving mechanism 36. The housing 34 may be and is preferably made of a plastic material by appropriate manufacturing methods such molding and the like. The housing 34 is generally comprised of a resilient, nose-like portion 38 and a base 40. The nose-like portion 38 of the housing 34 is attached to the stationary component 28, namely the reflector housing, through the orifice 30. The housing 34 has an axial bore 42 therethrough through which the threaded adjusting screw 32 is disposed.

The threaded adjusting screw 32 is formed from a high corrosion material or is coated with a high corrosion coating. The screw 32 is rotatable and axially displaceable relative to the housing 34. The adjusting screw 32 is comprised of an elongated threaded shaft 44 with a ball portion 46 at the end. The ball portion 46 is disposed in a complementarily shaped socket 48 formed on the pivotable component 24 and has fixed ears or nibs 50 in a spaced apart relationship which are fitted into complementary slots or spaces in the socket 48. The engagement of the nibs 50 in the slots causes the ball portion 46 to be held in the socket 48 and to be fixed against rotation.

The driving mechanism 36 is seated or disposed within the base 40 of the housing 34 and is operated by a drive component 52, which may take the form of a pre-assembled drive shaft, as shown, or a removable drive tool. The driving mechanism 36, when driven by the drive component 52, causes the rotation and axial displacement of the threaded adjusting screw 32 which displacement is used to adjust the position of the headlamp component 24 in a known manner.

The driving mechanism 36 includes a first mitered gear 54 and a second mitered gear 56, each of which are operatively associated with the base 40 of the housing 34. The first gear 54 encircles the adjusting screw 32. The drive component 52 is inserted into the housing 34, and engages the second gear 56. When the drive component 52 is rotated, rotation is imparted to the second gear 56 which imparts rotation to the first gear 54 which, in turn, causes the adjusting screw 32 to rotate and translate. When the adjustor mechanism 22 is actuated by the drive component 52, the adjustor mechanism 22 will pivot the headlamp component 24 about its axis until a desired aiming of the headlamp component 24 is achieved. The gear 54 has a non-circular bore in which the adjusting screw 32 is engaged with non-threaded flats on the adjusting screw 32, permitting the screw 32 to rotate with the gear 54, while also moving axially or translating. It is this axial or translatory movement of the adjusting screw 32 which is used to effect positioning of the headlamp component 26.

The housing 34 includes a plurality of O-rings to seal the housing 34 against the entry of dirt and moisture therein. O-ring 58 encircles the adjusting screw 32 and several O-rings (not shown) encircle the drive component 52.

An encapsulator member 60 is provided around the rear end of the adjusting screw 32 and is attached to the rear end of the housing 34. The encapsulator member 60 is a generally cylindrical, one piece, hollow member that surrounds the rear end of the adjusting screw 32. The encapsulator member 60 is substantially transparent and is made of a suitable material, such as plastic. The front end of the encapsulator member 60 terminates in a flange 62 which is ultrasonically welded, glued or otherwise affixed to the rear of the housing 34 to seal the rear portion of the housing 34 against the entry of dirt and moisture therein. The rear end of the encapsulator member 60 is open for reasons described herein.

A transparent follower member 64, which is made of a suitable material, such as plastic, is associated with the encapsulator member 60 and is used to designate an initial or "zero" position of the headlamp component 24. The follower member 64 is preferably, but not necessarily, a one piece member that encircles the encapsulator member 60. The follower member 64 is provided with an indicia, such as a number, to denote the "zero" position of the headlamp component 24. This indicia may be flanked by additional indicia, such as numbers, to denote variance from the zero position. The encapsulator member 60 and follower member 64 may be made in accordance with that disclosed in co-pending U.S. patent application Ser. No. 08/273,317, which is commonly owned by Applicant, and which disclosure is incorporated herein.

The novel venting structure 20 that is used with the adjustor mechanism 22 shown in FIG. 1 generally includes a through or vent passageway 66 which extends along the length of the adjustor housing 34. A one-way vent 68, which structure is described herein, is attached to the open rear end of the encapsulator 60 for venting pressure and moisture laden air from inside of the headlamp arrangement 26 to atmosphere while allowing air and a limited amount of moisture back into the headlamp arrangement 26.

The vent passageway 66 extends axially from the inside of the stationary component 28 to the rear end of the housing 28. The encapsulator member 60 encircles the rear end of the adjusting screw 32 and completely encircles the rear end of the vent passageway 66. In this embodiment, the vent passageway 66 is in fluid communication with the axial bore 42 in which the adjusting screw 32 is provided, i.e., there is no solid housing material separating the vent passageway 66 and the axial bore 42, such that air and moisture can flow along the length of the axial bore 42 and the vent passageway 66. It is to be understood that the vent passageway 66 may be completely separate from the axial bore 42 by solid housing material such that there is no possibility of fluid communication between the axial bore 42 and the vent passageway 66. In addition, the vent passageway 66 does not have to run axially through the housing 34 and instead, could be slanted or otherwise formed through the housing 34.

The one-way vent 68 includes a microporous filter material 70 which is housed in a tube-like body member 72. The filter material 70 is a non-woven hydrophobic membrane, such as Gore-tex®, preferably of a two/ten/twenty micron filter, to allow air and moisture to pass out from the inside of the headlamp arrangement 26 to the atmosphere while allowing air and a limited amount of moisture to return into the headlamp arrangement 26 as described herein. Gore-tex® is a registered trademark of W. L. Gore & Associates, Inc.

Figure 10:
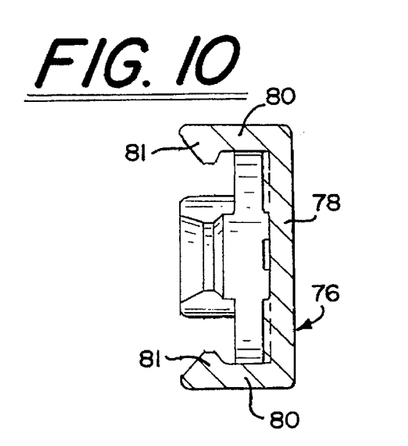
FIG. 10 is a cross-sectional view of a cap which forms part of the venting structure shown in FIGS. 1, 4, 6 and 8.

The tube-like body member 72 has an enlarged shoulder 74 at its rearmost end. A cap 76, as best shown in FIG. 10, snaps over the rearmost end of the tube-like body member 72, but does not seal the end of the body member 72. The cap 76 protects the microporous filter material 70 from dirt, dust or other particles. The cap 76 has an annular end wall 78 with a plurality of legs 80 that depend from the end wall 78 and which are spaced apart from each other. The legs 76 have an enlarged bead 81 on the end of each of the legs 76. When the cap 76 is attached to the rearmost end of the tube-like body member 72, the beads 81 on the legs 80 snap over the shoulder 74 on the tube-like body member 72 to securely hold the cap 76 in assembled relation therewith, but does not seal the end of the body member 72. One such suitable vent 68 of this type is manufactured by Filtertek, Inc. This type of vent 68 is compact and inexpensive.

The one-way vent 68 may be attached to the open rear end of the encapsulator member 60 by suitable means, such as by ultrasonically welding the tube-like body 72 around or within the end of the encapsulator member 60 or by adhesively joining the elements together. Alternatively, as shown in FIG. 3, the rear end of the encapsulator member 60 may include an enlarged shoulder 82 over which the bead 81 on the legs 80 snap to securely hold the vent 68 to the rear end of the encapsulator member 60. In this embodiment, the enlarged shoulder 74 on the tube-like body member 72 is securely captured between the end wall 78 of the cap 76 and the enlarged shoulder 74 of the encapsulator member 60.

When the pressure builds up within the headlamp arrangement 26, the pressurized air and any moisture which has accumulated therein will flow from inside of the stationary component 28 along the vent passageway 66 through the adjustor mechanism 22, through the hollow encapsulator member 60 and through the one-way vent 68 as shown by the arrows in FIGS. 1 and 1A. The microporous filter material 70 in the one-way vent 86 allows the moisture and air to pass from inside the encapsulator member 60 to the atmosphere, but only allows air and a minimal amount of moisture to pass back into the headlamp arrangement 26 from the atmosphere. Since air is allowed to return into the headlamp arrangement 26, the vent 68 allows the interior of the headlamp arrangement 26 to reach equilibrium with the atmosphere while keeping the entrance of water or moisture therein to a minimum.

Attention is now directed to FIGS. 4 and 5 which shows the second embodiment of the headlamp adjustor mechanism 22a in which the venting structure 20 may be formed. The headlamp adjustor mechanism 22a generally includes an elongated, threaded adjusting screw 32a, a housing 34a and a driving mechanism 36a. The adjusting screw 32a is identical in construction to the adjusting screw 32 used in the first embodiment of the adjustor mechanism 22. The housing 34a, which is preferably formed of plastic, is generally comprised of a resilient, nose-like portion 38a and a base 40a.

The nose-like portion 38a includes a plurality of resilient fingers or protrusions 84 which extend through the orifice 30 in the rearside of the stationary component 28. The resilient protrusions 84 can be snap-fit through the orifice 30. The housing 34a has an axial bore 42a therethrough through which the threaded adjusting screw 32a is disposed.

In this embodiment, the mitered gears 54, 56 of the driving mechanism 36 shown in FIGS. 1 and 1A of the first embodiment have been eliminated and instead, the driving mechanism 36a includes a stamped or die cast, metal gear 86 which is attached to a rear portion of the housing 34a. The gear 86 has circular body 88 with an aperture in the center. Surrounding the outermost extent of the body 88 are a series of teeth 90 which protrude from the gear 86 at a 90° angle from the body 88. As shown, the teeth 90 protrude in the forward direction, however, the teeth 90 may also protrude in the rearward direction. The gear 86 can be rotated by a suitable drive component (not shown) to impart movement to the adjusting screw member 32a to pivot the movable headlamp component.

An encapsulator member 60a is provided around the rear end of the adjusting screw 32a and is attached to the rear end of the housing 34a and to the rear surface of the gear 86 by suitable means, such as an ultrasonically weld or glue, to seal the rear portion of the housing 34a against the entry of dirt and moisture therein. The rear end of the encapsulator member 60a is open for attachment of a one-way vent 68 thereto. A transparent follower member 64a may be provided on the encapsulator member 60a. The encapsulator member 60a and follower member 64a may be made in accordance with that disclosed in co-pending U.S. patent application Ser. No. 08/036,817, which is commonly owned by Applicant, and which disclosure is incorporated herein.

The venting structure 20a that is formed in the adjustor mechanism 22a generally includes a through or vent passageway 66a which extends along the length of the housing 34a. A one-way vent 68, which structure is described hereinabove, is attached to the open rear end of the encapsulator 60a for venting pressure and moisture laden air from inside of the headlamp arrangement 26 to atmosphere while allowing air and a limited amount of moisture back into the headlamp arrangement 26.

The vent passageway 66a extends axially from the inside of the stationary component 28 to the rear end of the housing 28a. The encapsulator member 60a encircles the rear end of the adjusting screw 32a and completely encircles the rear end of the vent passageway 66a. In this embodiment, the vent passageway 66a is in fluid communication with the axial bore 42a in which the adjusting screw 32a is provided, i.e., there is no solid housing material separating the vent passageway 66a and the axial bore 42a, such that air and moisture can flow along the length of the axial bore 42a and the vent passageway 66a. It is to be understood that the vent passageway 66a may be completely separate from the axial bore 42a by solid housing material such that there is no possibility of fluid communication between the axial bore 42a and the vent passageway 66a. In addition, the vent passageway 66a does not have to run axially through the housing 34a and instead, could be slanted or otherwise formed through the housing 34a.

Since the structure of the one-way vent 68 has been described hereinabove, the specifics of the structure is not repeated herein. The one-way vent 68 may be attached to the end of the encapsulator member 60a by suitable means, such as by ultrasonically welding the tube-like body 72 around or within the end of the encapsulator member 60a or by adhesively joining the elements together. Alternatively, as shown in FIG. 3 and as described in detail hereinabove, the rear end of the encapsulator member 60a may include an enlarged shoulder over which the legs 80 on the cap 76 snap to securely hold the vent 68 to the rear end of the encapsulator member 60a.

When the pressure builds up within the headlamp arrangement 26, the pressurized air and any moisture which has accumulated therein will flow from inside of the stationary component 28 along the vent passageway 66a through the adjustor mechanism 22a, through the hollow encapsulator member 60a and through the one-way vent 68 as shown by the arrows in FIG. 4. The microporous filter material 70 in the tube-like body member 72 allows the moisture and air to pass from inside the encapsulator member 60a to the atmosphere, but only allows air and a minimal amount of moisture to pass back into the stationary component 28 from the atmosphere. Since air is allowed to return into the stationary component 28, the vent 68 allows the interior of the headlamp arrangement 26 to reach equilibrium with the atmosphere while keeping the entrance of water or moisture therein to a minimum.

Attention is now directed to the third embodiment of the headlamp adjustor mechanism 22b which has the venting structure 20b formed therewith, as described herein, and is shown in FIGS. 6 and 7. The headlamp adjustor mechanism 22b generally includes an elongate, threaded adjusting screw 32b and a housing 34b. The adjusting screw 32b is identical in construction to the adjusting screw 32 used in the first embodiment of the adjustor mechanism 22.

The housing 34b, which is preferably formed of plastic, is generally comprised of a resilient, nose-like portion 38b and a base 40b. The nose-like portion 38b of the housing 34b is attached to the stationary component 28 through the orifice 30. The housing 34b has a plurality of pockets 94 formed therein and an axial bore 42b therethrough. The pockets 94 and axial bore 42b are separated from each other by solid material. The threaded adjusting screw 32b is disposed within and through the axial bore 42b.

In this embodiment of the adjustor mechanism 22b, the driving mechanism 36, 36a has been eliminated. Instead, the adjusting screw 32b is manually rotated by engaging the adjusting screw 32b with suitable means. In addition, the encapsulator member 60, 60a and the follower member 64, 64a have been eliminated. The rear end of the housing 34b may be sealed by suitable means, such as O-rings (not shown), to prevent the entrance of moisture through the axial bore 42b into the stationary component 28.

The venting structure 20b that forms part of the adjustor mechanism 22b generally includes a through or vent passageway 66b which extends along the length of the housing 34b. A tube 96, which is formed of suitable materials, such as rubber, is attached to the rear end of the housing 34b at the end of the vent passageway 66b by suitable means, such as adhesive. A one-way vent 68, which structure is described hereinabove, is attached to the rear end of the tube 96 for venting pressure and moisture laden air from inside of the stationary component 28 to atmosphere while allowing air and a limited amount of moisture back into the stationary component 28.

The vent passageway 66b extends from the inside of the stationary component 28 to the rear end of the housing 28b. In this embodiment, the vent passageway 66b is formed separately from the axial bore 42b in which the adjusting screw 32b is provided such that solid housing material is between the vent passageway 66b and the axial bore 42b. It is to be understood that the vent passageway 66b may be formed as part of the axial bore 42b so that there is fluid communication between the axial bore 42b and the vent passageway 66b, if desired. In addition, while the vent passageway 66b is shown as being slanted from the front end of the housing 32b to the rear end of the housing 32b, the vent passageway 66b could instead run axially through the housing 34b or be otherwise formed through the housing 34b.

Since the structure of the one-way vent 68 has been described hereinabove, the specifics of the structure is not repeated herein. The one-way vent 68 may be attached to the rear end of the tube 96 by suitable means, such as by ultrasonically welding the tube-like body 72 around or within the end of the tube 96 or by adhesively joining the elements together.

When the pressure builds up within the headlamp arrangement 26, the pressurized air and any moisture which has accumulated therein will flow from inside of the arrangement 26 along the vent passageway 66b through the adjustor mechanism 22b, through the tube 96 and through the one-way vent 68 as shown by the arrows in FIG. 6. The microporous filter material 70 in the tube-like body member 72 allows the moisture and air to pass from the inside of the stationary component 28 to the atmosphere, but only allows air and a minimal amount of moisture to pass back into the stationary component 28 from the atmosphere. Since air is allowed to return into the stationary component 28, the vent 68 allows the interior of the headlamp arrangement 26 to reach equilibrium with the atmosphere while keeping the entrance of water or moisture therein to a minimum.

Attention is now directed to FIGS. 8 and 9 which shows an embodiment of the headlamp adjustor mechanism 22c in which the venting structure 20 may be formed. This embodiment of the headlamp adjustor mechanism 22c is substantially similar to the headlamp adjustor mechanism 22 shown in the second embodiment. The headlamp adjustor mechanism 22c generally includes an elongated, threaded adjusting screw 32c, a housing 34c, an encapsulator member 60c and a driving mechanism 36c. The housing 34c, which is preferably formed of plastic, is generally comprised of a resilient, nose-like portion 38c and a base 40c and includes a gear 86c therearound. The nose-like portion 38c, the gear 86c and the encapsulator member 60c are identical in construction to that of the second embodiment and a description of those elements is not repeated herein.

The housing 34c has an axial bore 42c therethrough which is sized to receive the screw 32c and through which the threaded adjusting screw 32c is disposed. The vent passageway 66a through the base 40a of the housing 34a, as shown in the second embodiment of the head adjustor mechanism 22a, has been eliminated in this embodiment.

The venting structure 20c that is formed in the adjustor mechanism 22c generally includes a through or vent passageway 66c which is provided through the adjusting screw 32c and extends along the length of the adjusting screw 32c. The vent passageway 66c is formed through the screw 32c by suitable means, such as by cold head, injection molding, forging, casting or screw machining. The passageway 66c may be formed through the center of the screw 32c, as shown, or offset from the center of the screw 32c. A one-way vent 68, which structure is described hereinabove, is attached to the open rear end of the encapsulator 60c, in the same manner as that disclosed in the second embodiment, for venting pressure and moisture laden air from inside of the headlamp arrangement 26 to atmosphere while allowing air and a limited amount of moisture back into the headlamp arrangement 26.

The vent passageway 66c extends axially from the inside of the stationary component 28 to the rear end of the screw 32c. The encapsulator member 60c encircles the rear end of the adjusting screw 32c and therefore completely encircles the rear end of the vent passageway 66c formed in the screw 32c.

When the pressure builds up within the headlamp arrangement 26, the pressurized air and any moisture which has accumulated therein will flow from inside of the stationary component 28 along the vent passageway 66c through the adjusting screw 32c, through the hollow encapsulator member 60c and through the one-way vent 68 to atmosphere as shown by the arrows in FIG. 8. The microporous filter material 70 in the tube-like body member 72 allows the moisture and air to pass from inside the encapsulator member 60c to the atmosphere, but only allows air and a minimal amount of moisture to pass back into the stationary component 28 from the atmosphere. Since air is allowed to return into the stationary component 28, the vent 68 allows the interior of the headlamp arrangement 26 to reach equilibrium with the atmosphere while keeping the entrance of water or moisture therein to a minimum.

It is to be understood that the vent passageway through the housing could be eliminated in any of the embodiments disclosed herein, or in any other headlamp adjustor mechanism in which the novel venting structure 20 of the present invention is provided and instead, the vent passageway could be provided through the adjusting screw. For example, in the embodiment shown in FIGS. 6 and 7, the vent passageway 66b through the housing 34b could be eliminated and the passageway instead be provided through the screw 32b. The one-way vent would then be suitably attached to the end of the adjusting screw 32b.

Alternatively, in the embodiments provided with the encapsulator member such as that shown in FIGS. 8 and 9, the through or vent passageway in the venting structure could be provided as a longitudinal groove in the outer surface of the adjusting screw through the thread portion of the screw. In this embodiment, the vent passageway through the housing has been eliminated. The vent passageway extends axially from the inside of the stationary component to the rear end of the screw. The encapsulator member encircles the rear end of the adjusting screw and therefore completely encircles the rear end of the vent passageway formed in the thread portion of the screw. The groove is milled in the thread portion after the screw is threaded or provided on a blank before the thread is rolled, with the rolled thread having a longitudinal interruption that provides the vent passageway. The one-way vent is provided on the end of the encapsulator member as described herein.

Figure 11:
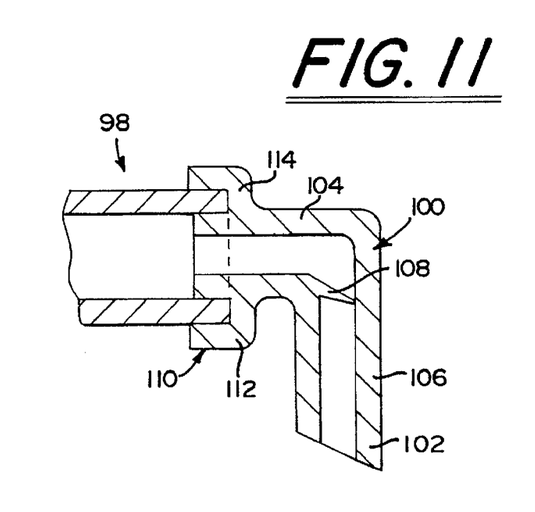
FIG. 11 is a cross-sectional view of an alternate embodiment of a vent which forms part of the venting structure.

Directing attention now to FIG. 11, another embodiment of a one-way vent 98 which can be used to vent any one of the embodiments of the adjustor mechanism 22, 22, 22b, 22c is illustrated. In this embodiment, the one-way vent 98 takes the form of a one-way flapper valve 100 and is attached to the adjustor mechanism 22, 22, 22b, 22c in the same position as which the one-way vent 68 is attached.

The one-way flapper valve 100 is formed of a rubber tube-like body 102 having a first portion 104 and second portion 106 that is generally at a right angle to the first portion 104. A resilient, rubber flap 108 is positioned along the length of the second portion 106. The resilient flap 108 is angled at a downward slant such that pressure and moisture laden air will only open the flap 108 in one direction, i.e. when the air and moisture are flowing out to atmosphere from the inside of the stationary component 28, but when air and moisture attempt to flow back through the flapper valve 100, the flap 108 substantially blocks the flow of air and moisture therethrough.

A connector portion 110 connects the one-way rubber flapper valve 100 to the open end of the encapsulator member 60, 60a, 60c or to the tube 96. As shown in FIG. 11, the connector 110 takes the form of an annular wall 112 that is connected to the end of the first portion 104 by a shoulder 114. The annular wall 112 is spaced from the first portion 104 at a distance which is slightly smaller than the width of the encapsulator member wall or the tube wall. When the one-way vent 98 is attached to the end of the encapsulator member 60, 60a, 60c or to the tube 96, the wall of the encapsulator member 60, 60a, 60c or tube 96 is captured between the annular wall 112 and the end of the first portion 104. In addition, the connector portion 110 can be glued to the end of the encapsulator member 60, 60a, 60c or tube 96 to further insure that the vent 98 will remain attached as air and moisture pass through the vent 98. Alternatively, the annular wall 112 and shoulder 114 can be eliminated and the end of the first portion 104 can be glued or otherwise affixed to the outside or inside of the end of the encapsulator member 60, 60a, 60c or tube 96.

When the pressure builds up within the headlamp arrangement, the pressurized air and any moisture which has accumulated therein will flow from inside of the stationary component 28, along the vent passageway 66, 66a, 66b, 66c through the adjustor mechanism 22, 22a, 22b, 22c respectively, through the encapsulator member 60, 60a, 60c or the tube 96 and then through the vent 98. The air and moisture force the flap 108 downwardly to provide a passageway for the air and moisture to flow out of the vent 98. When the pressure from the air and moisture drops to a certain level, the flap 98 will reassume its initial position to prevent the flow of a substantial amount of air or moisture through the vent 98. A sufficient amount of air is able to leak back into the headlamp arrangement 26 around the flap 108 in the vent 98 so that the interior of the headlamp arrangement 26 can reach equilibrium with the atmosphere while keeping the entrance of water or moisture therein to a minimum.

The adjustor mechanism 22, 22a, 22b, 22c of the present invention serves a dual purpose. The mechanism 22, 22a, 22b, 22c vents as well as adjusts the position of the moveable headlamp component 24. Since the vent 68, 98 has been incorporated into the adjustor mechanism structure, the overall cost of the headlamp arrangement 26 is reduced. In effect, the problem of cracks in the seals found in prior art sealed headlamp arrangements has been eliminated by creating a controlled leak through the venting structure 20, 20a, 20b, 20c.

It is also to be understood that while specific embodiments of the one-way vents 68, 98 are shown and described, one of ordinary skill in the art could modify the type of vent used in the present invention or the exact location of the vent 68, 98 on the adjustor mechanism 22, 22a, 22b, 22c. For example, the one-way vent may also take the form of a rubber diaphragm-type vent. Additionally, instead of providing a tube 96, a large enough hole could be provided in the housing 34b, and the vent 68, 98 attached therein.

While preferred embodiments of the present invention are shown and described, it is envisioned that those skilled in the art may devise various modifications of the present invention without departing from the spirit and scope of the appended claims.

The invention claimed is:

1. A venting structure for use with a headlamp adjustor mechanism which is used to effect pivotal motion of a movable headlamp component in a headlamp arrangement, said headlamp adjustor mechanism being adapted to be mounted to a sealed stationary component of the headlamp arrangement, said headlamp adjustor mechanism including an adjusting screw member having an end adapted for operable engagement with the movable component, a housing member connected to the stationary component, said housing member having an axial bore in which said adjusting screw member is operatively engaged, said venting structure comprising: a vent passageway through the headlamp adjustor mechanism; a vent which is connected to said headlamp adjustor mechanism and is in communication with said vent passageway, said vent allowing air to pass outwardly from the inside of the sealed stationary component to the exterior of said sealed component while allowing air to pass from the exterior of said sealed component to the inside of the sealed stationary component.

2. A venting structure as defined in claim 1, wherein said vent comprises a microporous filter material.

3. A venting structure as defined in claim 2, wherein said vent further includes a tube member for housing said microporous filter material and a cap which is engaged with said tube member which allows the passage of air from inside of the tube member to the atmosphere.

4. A venting structure as defined in claim 1, wherein said vent is a flapper valve.

5. A venting structure as defined in claim 4, wherein said flapper valve is rubber.

6. A venting structure as defined in claim 1, wherein said vent passageway is formed through said housing member.

7. A venting structure as defined in claim 1, wherein said vent passageway is formed through said adjusting screw member.

8. A venting structure as defined in claim 7, wherein said adjusting screw member includes a threaded portion, and said vent passageway is formed through said threaded portion.

9. A venting structure in combination with a headlamp adjustor mechanism which is used to effect pivotal motion of a movable headlamp component which is housed in a sealed stationary component of a headlamp arrangement, said headlamp adjustor mechanism comprising: an adjusting screw member having an end adapted for operable engagement with the movable headlamp component, a housing member connected to the stationary component of the headlamp arrangement, said housing member having an axial bore in which said adjusting screw member is operatively engaged; and said venting structure comprising a vent passageway through said headlamp adjustor mechanism and a vent which is connected to said headlamp adjustor mechanism and is in communication with the vent passageway, said vent allowing air to pass outwardly from the inside of the sealed stationary component to the exterior of said sealed component while allowing air to pass from the exterior of said sealed component to the inside of the sealed stationary component.

10. The combination as defined in claim 9, wherein said vent comprises a microporous filter material.

11. The combination as defined in claim 10, wherein said vent further includes a tube member for housing said microporous filter material and a cap which is engaged with said tube member which allows the passage of air from inside of the tube member to the atmosphere.

12. The combination as defined in claim 9, wherein said vent is a flapper valve.

13. The combination as defined in claim 12, wherein said flapper valve is rubber.

14. The combination as defined in claim 9, wherein said vent passageway is formed through said housing member.

15. The combination as defined in claim 9, wherein said vent passageway is formed through said adjusting screw member.

16. The combination as defined in claim 15, wherein said adjusting screw member includes a threaded portion, and said vent passageway is formed through said threaded portion.

17. The combination as defined in claim 9, said headlamp adjustor mechanism further including gearing means for engagement by a drive member for axially moving said screw member.

18. A headlamp adjustor mechanism which is used to effect pivotal motion of a movable headlamp component in a headlamp arrangement, comprising: a housing adapted for sealed engagement with a component of a headlamp arrangement, with a portion of said housing being in communication with the interior of said headlamp arrangement, and a vent passageway provided by said headlamp adjustor mechanism such that when said headlamp adjustor mechanism is in engagement with said housing, said vent passageway provides a vent path leading from the interior of said headlamp arrangement to the exterior thereof.

19. A headlamp adjustor mechanism as defined in claim 18, wherein said headlamp adjustor mechanism includes an additional vent associated with said passageway.

20. A headlamp adjustor mechanism as defined in claim 19, wherein said vent passageway is provided by a through bore provided through said adjustor mechanism from the interior of said headlamp arrangement to the exterior of said headlamp arrangement, said additional vent being in fluid communication with said through bore.

21. A headlamp adjustor mechanism as defined in claim 19, said additional vent comprises a microporous filter material.

22. A headlamp adjustor mechanism as defined in claim 21, wherein said vent further includes a tube member for housing said microporous filter material and a cap which is engaged with said tube member which allows the passage of air from inside of the tube member to the atmosphere.

23. A headlamp adjustor mechanism as defined in claim 19, wherein said additional vent is a flapper valve.

24. A headlamp adjustor mechanism as defined in claim 18, wherein said vent passageway is provided by a through bore defined by said adjustor mechanism extending from the interior of said headlamp component to the exterior thereof.

25. A method of venting air and moisture from an interior of a headlamp arrangement, said headlamp arrangement including a movable headlamp component which is housed in a sealed stationary component, said method comprising the steps of:

providing a headlamp adjustor mechanism which is used to effect pivotal motion of a movable headlamp component in a headlamp arrangement when said headlamp adjustor mechanism is in engagement therewith, said headlamp adjustor mechanism being in sealed engagement with said sealed stationary component, with a portion of said headlamp adjustor mechanism being in fluid communication with the interior of said headlamp arrangement;

providing a vent structure comprising a vent passageway through said headlamp adjustor mechanism; and venting air and moisture outwardly from the inside of the sealed stationary component to the atmosphere through said headlamp adjustor mechanism and said vent structure provided by said headlamp adjustor mechanism.

26. A method as defined in claim 25, further including the step of allowing air and a limited amount of moisture to pass from the atmosphere to the interior of the sealed stationary component through said vent structure.

27. A method as defined in claim 25, wherein said step of providing a vent structure further comprises providing a one-way vent which is connected to said headlamp adjustor mechanism and is in fluid communication with the vent passageway.

* * * * *